(12) United States Patent
Herman et al.

(10) Patent No.: US 6,893,769 B2
(45) Date of Patent: May 17, 2005

(54) FUEL CELL ASSEMBLIES AND METHODS OF MAKING THE SAME

(75) Inventors: Gregory S Herman, Albany, OR (US); Peter Mardilovich, Corvallis, OR (US); David Champion, Lebanon, OR (US); James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 215 days.

(21) Appl. No.: 10/323,449

(22) Filed: Dec. 18, 2002

(65) Prior Publication Data

US 2004/0121217 A1 Jun. 24, 2004

(51) Int. Cl.⁷ ............ H01M 2/14; H01M 2/00; H01M 8/10
(52) U.S. Cl. ............ 429/38; 429/39; 429/34; 429/30; 429/31; 429/32; 29/623.1
(58) Field of Search .............. 429/38, 39, 34, 429/30, 31, 32; 29/623.1

(56) References Cited

U.S. PATENT DOCUMENTS

| | | | | |
|---|---|---|---|---|
| 5,589,285 A | * | 12/1996 | Cable et al. ............ | 429/13 |
| 6,361,892 B1 | * | 3/2002 | Ruhl et al. ............ | 429/30 |
| 2003/0165727 A1 | * | 9/2003 | Priestnall et al. ............ | 429/34 |

FOREIGN PATENT DOCUMENTS

| EP | 503526 | 9/1992 |
|---|---|---|
| WO | WO 01/73880 | 10/2001 |
| WO | WO 01/73881 | 10/2001 |
| WO | WO01/73881 | 10/2001 |
| WO | WO 01/89011 | 11/2001 |

* cited by examiner

*Primary Examiner*—Dah-Wei Yaun
*Assistant Examiner*—Angela J. Martin (57) ABSTRACT

A fuel cell in accordance with a present invention includes a plurality of reactant channels.

37 Claims, 12 Drawing Sheets

FUEL CELL ASSEMBLIES AND METHODS OF MAKING THE SAME

BACKGROUND OF THE INVENTIONS

1. Field of the Inventions

The present inventions are related to fuel cells.

2. Description of the Related Art

Fuel cells, which convert reactants (i.e. fuel and oxidant) into electricity and reaction products, are advantageous because they are not hampered by lengthy recharging cycles, as are rechargeable batteries, and are relatively small, light-weight and produce virtually no environmental emissions. Nevertheless, the present inventors have determined that conventional fuel cells are susceptible to improvement. For example, the present inventors have determined that it would be desirable to improve the performance of fuel cells in which the reactants are combined prior to the electricity producing reaction. Such fuel cells are sometimes referred to as "single chamber fuel cells."

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of fuel cell structures that are not pertinent to the present inventions have been omitted for the sake of simplicity. The present inventions are also applicable to a wide range of fuel cell technologies and fuel cell systems, including those presently being developed or yet to be developed. For example, although various exemplary fuel cell system are described below with reference to solid oxide fuel cells ("SOFCs"), other types of fuel cells, such as proton exchange membrane ("PEM") fuel cells, are equally applicable to the present inventions.

As illustrated for example in FIGS. 1–4C, a fuel cell system 100 in accordance with one embodiment of a present invention includes one or more solid oxide fuel cell assemblies 102. Each fuel cell assembly 102 includes one or more fuel cells 104, with an anode 106 and a cathode 108 separated by an electrolyte 110, and a substrate 112. [Note FIG. 4B.] Although the quantity of fuel cells 104 is not limited to any particular number, the exemplary assembly 102 includes three fuel cells, although one of the anodes 106 is shared between two fuel cells, as is one cathodes 108. The lowermost anode 106 may be "above" the lowermost cathode 108 (as shown) or the relative orientation may be reversed. The anodes 106 are connected to one another and to an anode contact pad 114, while the cathodes 108 are connected to one another and to a contact pad 116. [Note FIG. 3.] One or more fuel cell assemblies 102 are arranged in an assembly package 118 which includes the appropriate manifolds (not shown) in the exemplary embodiment. Assembly packages 118 which include multiple fuel cell assemblies 102 are also referred to as "stacks."

Figure 2:
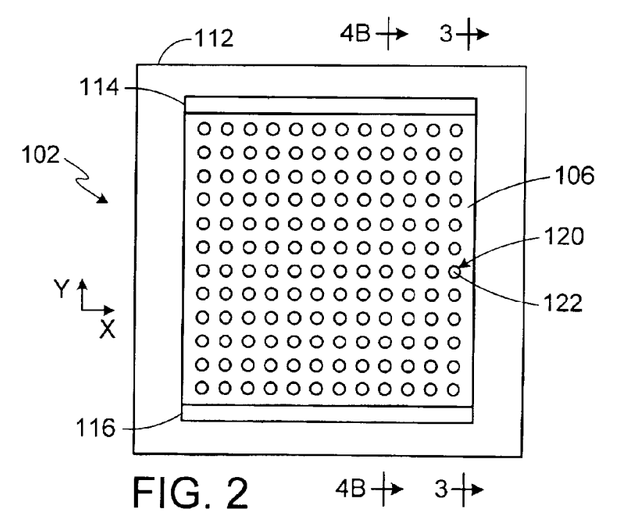
FIG. 2 is a plan view of a fuel cell assembly in accordance with a preferred embodiment of a present invention.
Figure 3:
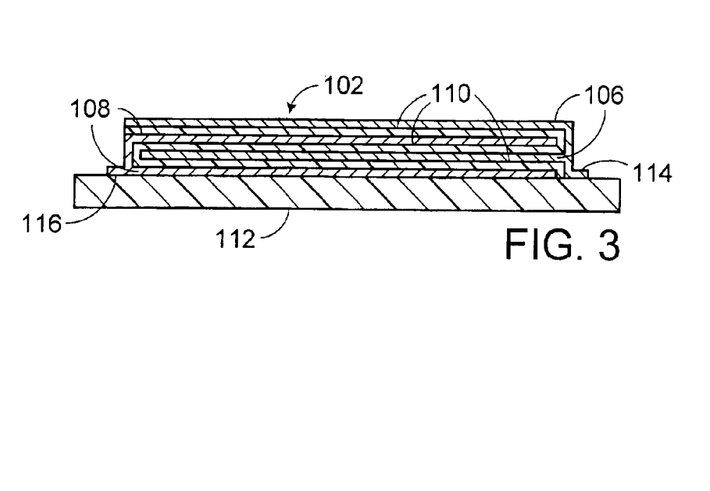
FIG. 3 is a section view taken along line 3—3 in FIG. 2.
Figure 4A:
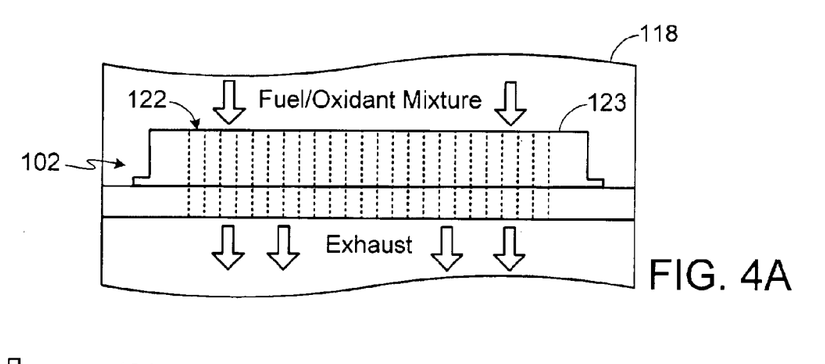
FIG. 4A is a side view of a fuel cell in accordance with a preferred embodiment of a present invention.
Figure 4B:
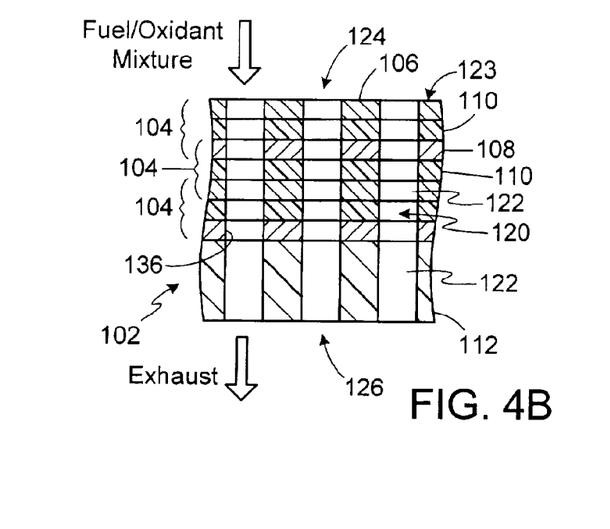
FIG. 4B is an enlarged section view taken along line 4B—4B in FIG. 2.
Figure 4C:
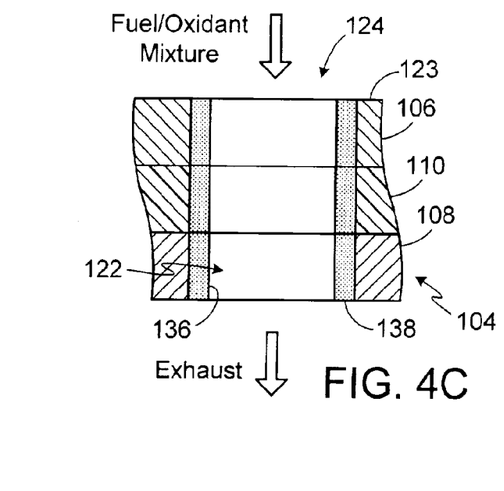
FIG. 4C is a further enlarged version of the section view illustrated in FIG. 4B.

The fuel cells 104 in the exemplary fuel cell assembly 102 illustrated in FIGS. 1–4C also include one or more reactant channels 120 that extend through the fuel cell assemblies and through which reactants, such as a fuel/oxidant mixture, are directed. Referring more specifically to FIGS. 4A–4C, the fuel cell package 118 is configured to direct the fuel/oxidant mixture through the reactant channels 120. The package 118 is also configured to receive the exhaust (e.g. byproducts and any unused reactants) from the reactions which occur within the reactant channels 120 and vent the exhaust away from the fuel cell assembly 102. Each anode 106, cathode 108 and electrolyte 110 includes one or more reactant apertures 122 that are aligned with one another and together form the reactant channels 120. The substrate 112 includes similar reactant apertures 122 which are aligned with reactant apertures in the fuel cells 104. Thus, when a substrate 112 is used in combination with one or more fuel cells 104 in accordance with the present inventions, the reactant apertures 122 in the substrate also form part of the reactant channels 120.

The reactant channels 120 define inlet ends 124 which are coextensive with the top of the reactant apertures in the top anode 106 and outlet ends 126 which are coextensive with the bottom of the reactant apertures in the substrate 112 and through which the exhaust from the chemical reaction exits the assembly 102. It should be noted that the "inlet" and "outlet" designations are dependent on the orientation of the fuel cell assembly relative to the direction of reactant flow. In those instances where the reactants enter the assembly 102 by way of the substrate 112, channel end 124 would be the outlet and channel end 126 would be the inlet. Additionally, although the exemplary reactant channels 120 are generally perpendicular to the remainder of the fuel cell assembly 102, the reactant channels may also be arranged at an angle other than 90 degrees to the remainder of the fuel cell assembly.

It should be noted that the reactant channels 120 are the primary vehicle through which the reactants pass through the fuel cells 104 in the reactant flow direction. Even in those instances where the materials which make up the anodes 106, cathodes 108 and/or electrolytes 110 are somewhat porous, the reactant channels 120 are discrete structures that are not the merely the connections of various pores. The air/fuel mixture will pass through the react channels 120, as opposed to simply diffusing through the top surface 123 of the fuel cell assembly 102.

Figure 1:
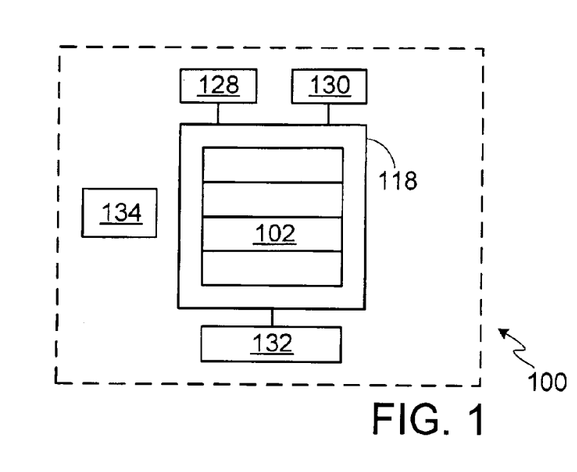
FIG. 1 is a diagrammatic view of a fuel cell system in accordance with a preferred embodiment of a present invention.

Fuel, such as $H_2$ or hydrocarbon fuels such as $CH_4$, $C_2H_6$, $C_3H_8$, is supplied by a fuel supply 128 in the exemplary implementation, and oxidant, such as $O_2$ or ambient air, is supplied by an oxidant supply 130 in the exemplary system 100 illustrated in FIG. 1. In those instances where ambient air is used, the oxidant supply may simply be a vent or a vent and fan arrangement. The fuel and oxidant are combined by the manifold arrangement in the package 118 and the fuel/oxidant mixture directed through the reactant channels 120 in the manner described above with reference to FIGS. 4A–4C. The oxidant within each channel 120 is electrochemically ionized at the cathodes 108, thereby producing ions that diffuse through the conducting electrolytes 110 and react with the fuel at the anodes 106 to produce byproducts ($CO_2$ and water vapor in the exemplary embodiment). The byproducts and any unused reactants exit the reactant channels 120 through the outlet ends 126 and are vented out of the package 118 by way of the byproduct outlet 132. A controller 134 may be provided to monitor and control the operations of the exemplary fuel cell system 100. Alternatively, the operation of the fuel cell system may be controlled by the host (i.e. power consuming) device.

It should be noted here that the present fuel cell systems 100 include those in which the fuel supply 128 is replenishable (or replaceable) as well as those in which all of the fuel that will be consumed is initially present in the fuel supply. Additionally, the package 118 and fuel supply 128 may be located within a common housing if desired.

Referring more specifically to FIGS. 4B and 4C, at a minimum, the reaction will occur on the inner surfaces 136 of the reactant channels 120, i.e. the inner surfaces of the reactant apertures 122 in the anode 106, cathode 108, and electrolyte 110, and it is the inner surface of the channels that defines the baseline active surface area for the reaction. Nevertheless, the anode 106, cathode 108 and/or electrolyte 110 may be formed from porous materials that allow the reactants within the channels 120 to diffuse into portions 138 of the anode, cathode and electrolyte. Such diffusion, which would be about 0.1–3.0 mm (typically 0.5–1.5 mm) in the exemplary configuration described below, increases the active surface area for the reaction and improves the over all efficiency of the fuel cells 104. It should be noted that such diffusion is occurring in a direction transverse to the flow direction of the air/fuel mixture and, as noted above, the primary path in the flow direction for the air/fuel mixture is through the reactant channels 120.

With respect to current collection, current collectors (not shown) that extend between the reactant apertures 122 to the contact pads 114 and 116 may be formed within each anode 106 and cathode 108. Suitable current collector materials include stainless steel, silver (cathode only), gold and platinum. Alternatively, materials such as lanthanum strontium chromite with good electrical conductive properties may be added to the materials used to form the anodes 106 and cathodes 108. The anode contact pads 114 of adjacent fuel cell assemblies 102 in the package 118 may be connected to one another in series, as may the cathode contact pads 116. The actual connection scheme will, however, depend on the power requirements of the load.

Although the materials, dimensions, and configuration of the exemplary fuel cells 104 and substrate 112 will depend upon the type of fuel cell (e.g. SOFC, PEM, etc.) and intended application, and although the present inventions are not limited to any particular materials, dimensions, configuration or type, an exemplary fuel cell assembly 102 including SOFCs is described below. The fuel cells 104 are preferably a "thin" fuel cell (i.e. a fuel cell that is between about 5–750 μm thick). The anodes are preferably a porous, ceramic and metal composite (also referred to as "cermet") film that is about 1–500 μm thick (typically 5–50 μm thick). Suitable ceramics include samaria-doped ceria ("SDC"), gandolinia-doped ceria (GDC) and yttria stabilized zirconia ("YSZ") and suitable metals include nickel and copper. The exemplary cathodes 108 are preferably a porous ceramic that is about 1–500 μm thick (typically 5–50 μm thick). Suitable ceramic materials include samarium strontium cobaltite ("SSCO"), lanthanum strontium maganite, bismuth copper substituted vanadate. The electrolytes 110 are preferably a porous ceramic such as SDC, GDC, YSZ or lanthanum strontium gallium magnesium ("LSGM") that is about 1–500 μm thick (typically 5–50 μm thick). The surface area of the anodes 106, cathodes 108 and electrolytes 110, when viewed in plan as illustrated in FIG. 3, will typically be between about 0.001 cm$^2$ to about 10,000 cm$^2$ (typically about 2.5–250 cm$^2$) less the surface area of the reactant channel(s).

Turning to the exemplary substrate 112, it is preferably formed from strong, inert material such as a ceramic material (e.g. alumina, stabilized zirconia, magnesia, forsterite and Macor®), a metallic material (e.g. stainless steel or Inconel®), a polymeric material (e.g. polysulfone or polycarbonate) or a combination thereof. Polymeric substrates are most applicable to fuel cells, such as PEM fuel cells, that operate at relatively low temperatures. Additionally, the substrate material that is selected for a particular fuel cell should have a coefficient of expansion that matches the anode, cathode, electrolyte, interconnects and packaging. The thickness of the substrate 112 will typically be about 100–1000 μm. The majority of the overall surface area of the substrate 112 will preferably be the region including the reactant apertures 122 and the area of the reactant apertures (viewed in plan) should be maximized in order to maximize the active surface area.

In those instances where the substrate 112 is a ceramic substrate, the reactant apertures 122 will preferably be formed in the substrate material prior to firing while the material is still in the green state because a relatively simple hole punch may be used. The punched green substrate material may then be fired to burn out the organic solvents and binders and sinter together the ceramic materials, thereby forming the substrate 112. The size of the pre-fired punched reactant apertures 122 should also be slightly larger than the desired size because they will shrink (typically about 15%) during firing. The reactant apertures 122 may also be formed by punching ceramic material that has already been fired. Here, however, more sophisticated cutting methods (such as laser ablation) may be required. Additionally, in those instances where polymeric materials are employed, the substrate 112 may be molded with the reactant apertures 122 already in place.

Although the present inventions are not limited to any particular cross-sectional shape, the exemplary reactant apertures 122 in the anodes 106, cathodes 108, electrolytes 110 and substrate 112 are circular, are about 0.1 to 5.0 mm in diameter and are arranged in a two-dimensional pattern where they are spaced apart by about 0.1 mm to 2 mm (edge to edge) in the X-direction and Y-direction. Other cross-sectional shapes such as, for example, triangles, rectangles, squares and hexagons, may also be employed. [It should be noted here that given the order of magnitude differences in the sizes of the various aspects of the present fuel cell assemblies, the drawings in the present application are not drawn to scale.] Although the hole placement pattern is square, the pattern may be hexagonal, triangular or any other shape that provides the desired packing density. Additionally, although the overall shape of the fuel cells 104 and substrate 112 is square (note FIG. 2), the present inventions are not limited to any particular shape. Circles, rectangles, hexagons, etc. are equally applicable shapes. The reactant apertures 122 will typically occupy about 50 to 90% of the surface area of the anodes 106, cathodes 108 and electrolytes 110.

Turning to manufacture, fuel cell assemblies and fuel cells in accordance with the present inventions may be manufactured by a variety of methods. Such methods include, but are not limited to, screen printing and other printing techniques, lithography, isostatic pressing, and deposition/etch processes. Additionally, as also described below, the reactant channels 120 may be formed by creating the reactant apertures 122 during the formation of the substrate 112 and each anode 106, cathode 108, and electrolyte 110. Alternatively, the reactant channels 120 may be formed after the fuel cells 104 and/or substrates 112 have been otherwise completed.

Figure 5A:
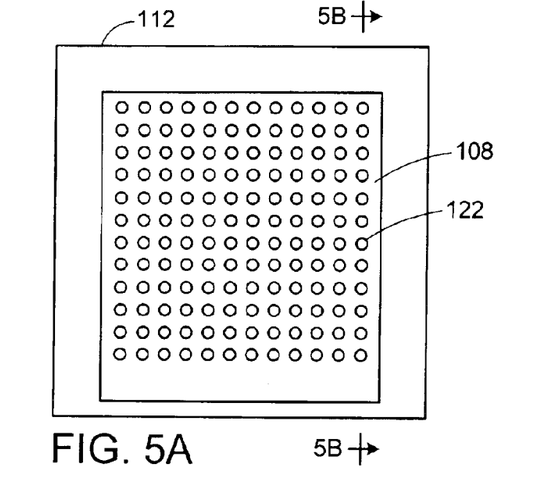
FIG. 5A is a plan view illustrating a step in a fuel cell assembly manufacturing process in accordance with a preferred embodiment of a present invention.
Figure 5B:
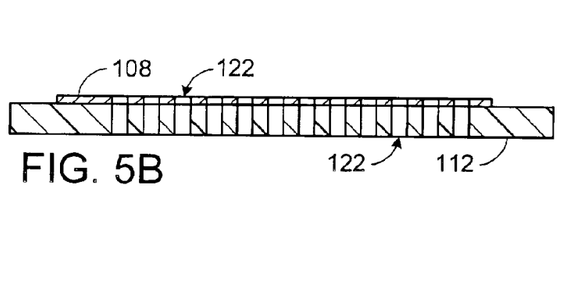
FIG. 5B is a section view taken along line 5B—5B in FIG. 5A.
Figure 5C:
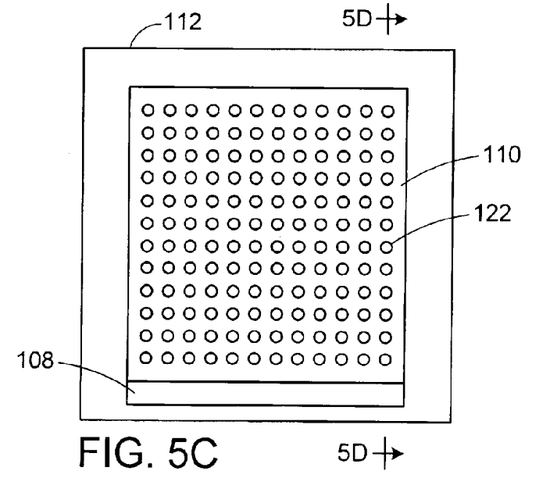
FIG. 5C is a plan view illustrating a step in a fuel cell assembly manufacturing process in accordance with a preferred embodiment of a present invention.
Figure 5D:
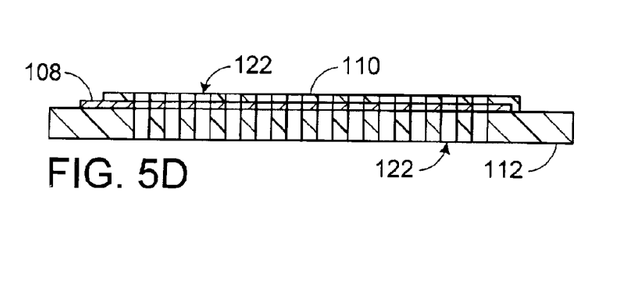
FIG. 5D is a section view taken along line 5D—5D in FIG. 5C.
Figure 5E:
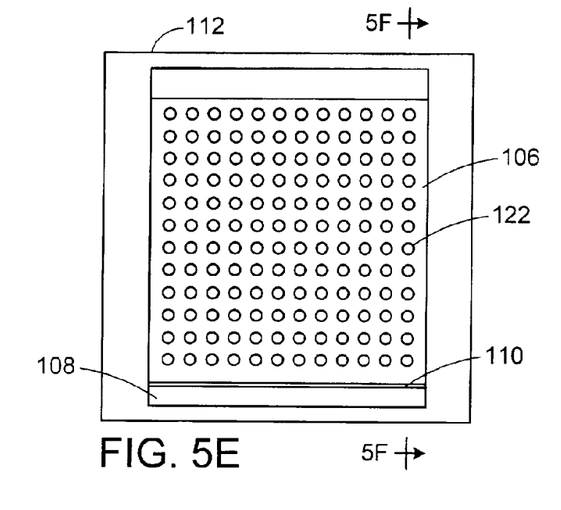
FIG. 5E is a plan view illustrating a step in a fuel cell assembly manufacturing process in accordance with a preferred embodiment of a present invention.
Figure 5F:
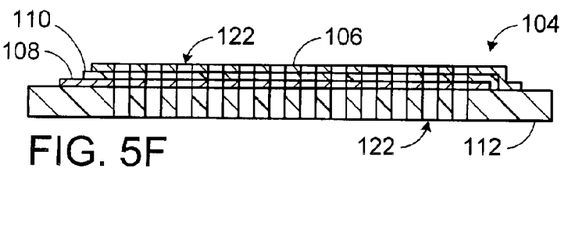
FIG. 5F is a section view taken along line 5F—5F in FIG. 5E.
Figure 5G:
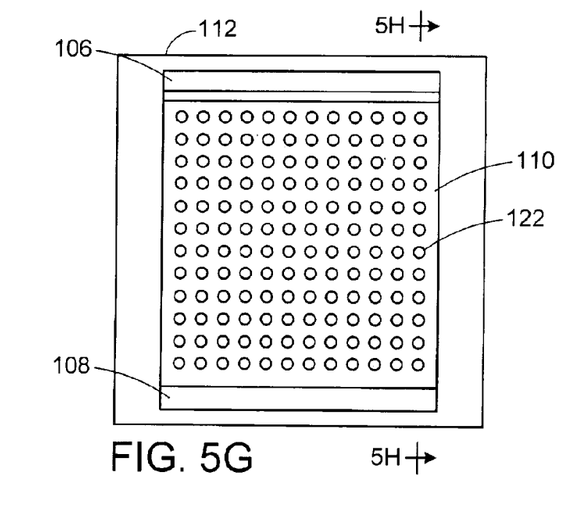
FIG. 5G is a plan view illustrating a step in a fuel cell assembly manufacturing process in accordance with a preferred embodiment of a present invention.
Figure 5H:
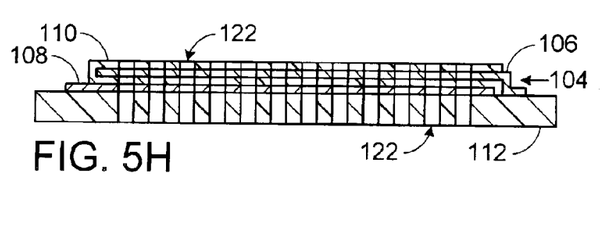
FIG. 5H is a section view taken along line 5H—5H in FIG. 5G.
Figure 5I:
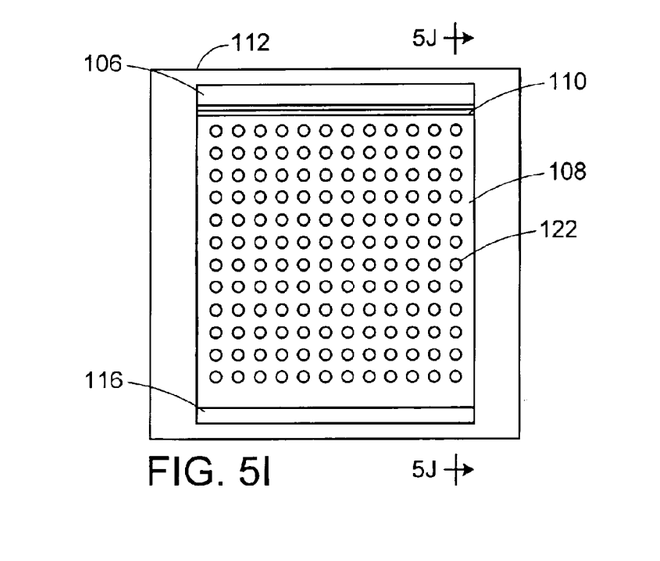
FIG. 5I is a plan view illustrating a step in a fuel cell assembly manufacturing process in accordance with a preferred embodiment of a present invention.
Figure 5J:
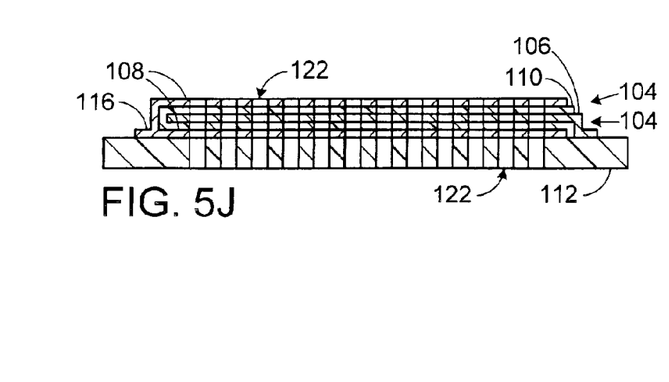
FIG. 5J is a section view taken along line 5J—5J in FIG. 5I.
Figure 5K:
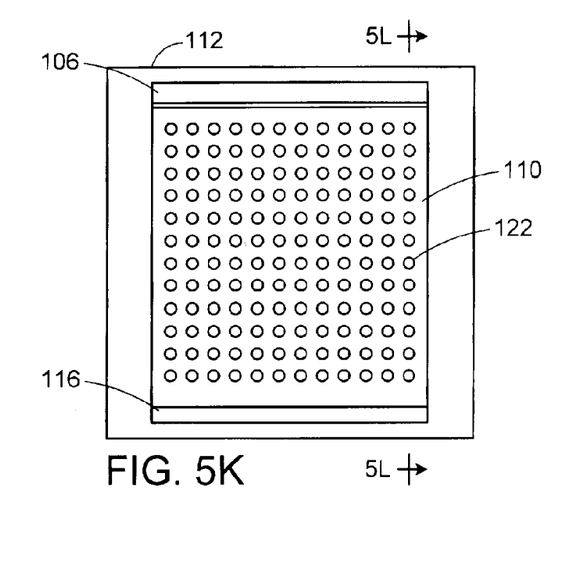
FIG. 5K is a plan view illustrating a step in a fuel cell assembly manufacturing process in accordance with a preferred embodiment of a present invention.
Figure 5L:
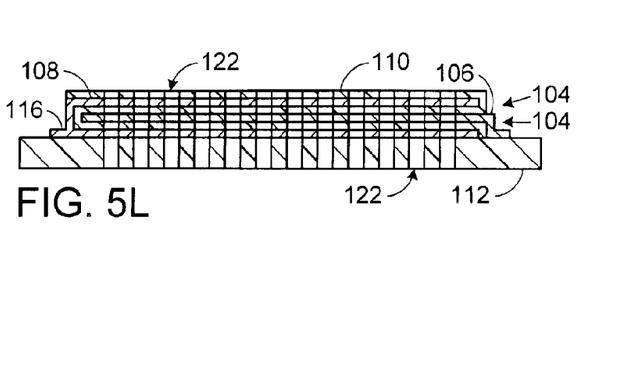
FIG. 5L is a section view taken along line 5L—5L in FIG. 5K.
Figure 5M:
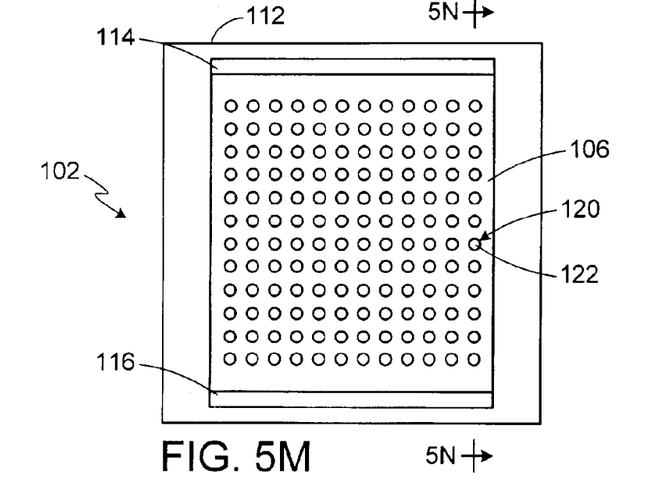
FIG. 5M is a plan view illustrating a step in a fuel cell assembly manufacturing process in accordance with a preferred embodiment of a present invention.
Figure 5N:
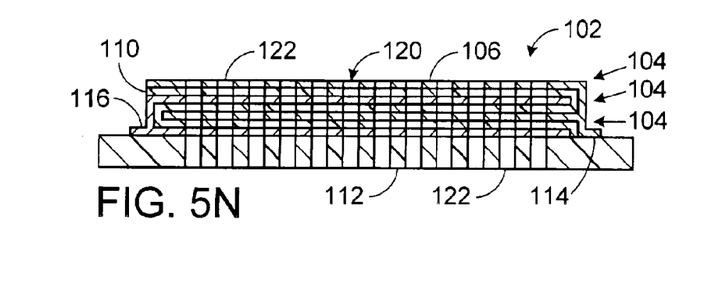
FIG. 5N is a section view taken along line 5N—5N in FIG. 5M.

One exemplary method of manufacturing the fuel cell assembly 102, which involves the use of screen printing techniques, is illustrated in FIGS. 5A–5N. Preferably, each element of the fuel cells 104 (i.e. each anode, cathode and electrolyte) is deposited using a screen printing process. Referring first to FIGS. 5A and 5B, the substrate 112 is provided with the reactant apertures 122 already present. The material which forms the first electrode (here, the cathode 108) in the fuel cell is deposited onto the substrate 112 with the reactant apertures 122 in place and aligned with the reactant apertures in the substrate. Next, as illustrated in FIGS. 5C and 5D, the material which forms the electrolyte 110 is deposited onto the cathode 108 with the reactant apertures 122 in place and aligned with the reactant apertures in the cathode. The end of the cathode 108 which will ultimately form the contact pad 116 (note FIG. 3) is left exposed, while the opposite end is covered by the electrolyte 110. Turning to FIGS. 5E and 5F, the first fuel cell 104 in the three-fuel cell exemplary implementation is completed by depositing the material which forms the second electrode (here, the anode 106) onto the electrolyte 110 with the reactant apertures 122 in place and aligned with the reactant apertures in electrolyte. A portion of the anode material also covers a portion of the substrate 112 and this anode material will ultimately form the contact pad 114 (note FIG. 3).

Next, as illustrated for example in FIGS. 5G and 5H, the material that forms the electrolyte 110 is deposited onto the anode 106 with the reactant apertures 122 in place and aligned with the reactant apertures in the anode. The end of the anode 106 which will ultimately form part of the contact pad 114 (note FIG. 3) is left exposed, as is a small portion that will ultimately be connected to another anode, while the opposite end is covered by the electrolyte 110. The material for another cathode 108 is then deposited onto the electrolyte 110 with the reactant apertures 122 in place and aligned with the reactant apertures in the electrolyte to form the second fuel cell 104. [FIGS. 5I and 5J.] In addition to covering the majority of the electrolyte 110, the just-formed cathode 108 will connect to the previously formed cathode. Turning to FIGS. 5K and 5L, the material for the next electrolyte 110 is deposited onto the cathode 108 with the reactant apertures 122 in place and aligned with the reactant apertures in the cathode 108. The electrolyte 110 extends from one of the cathode 108 to an area beyond the other end of the cathode such that it combines with the previously formed electrolyte. The third fuel cell 104, as well as the exemplary fuel cell assembly 102, is completed by depositing the material that forms the anode 106 onto the electrolyte 110, with the reactant apertures 122 in place. [FIGS. 5M and 5N.] The reactant apertures 122 in the anode 106 will be aligned with the reactant apertures in electrolyte 110, thereby completing the reactant channels 120, and a portion of the anode will connect with the previously formed anode.

With respect to firing, the partially completed structure may be heated to a temperature of about 200° C. to about 1400° C. each time the material for an anode 106, cathode 108 or electrolyte 110 has been deposited. The exact temperature would depend on the type of materials involved. Alternatively, a single firing may be performed after all of the anodes 106, cathodes 108 and electrolytes 110 have been deposited onto the substrate 112.

Figure 6A:
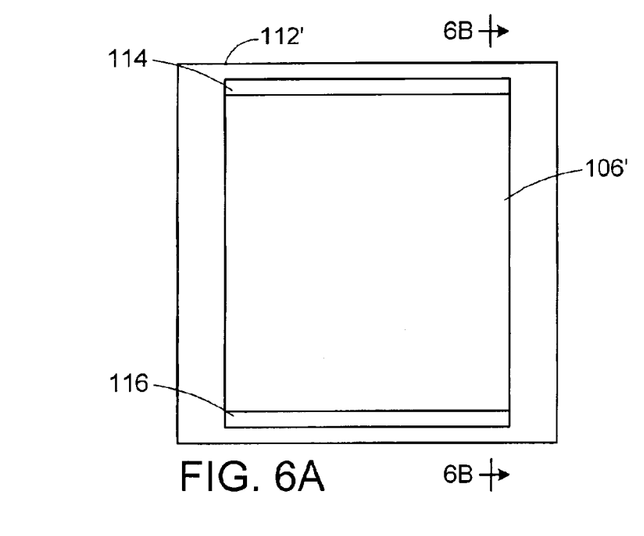
FIG. 6A is a plan view illustrating a step in a fuel cell assembly manufacturing process in accordance with a preferred embodiment of a present invention.
Figure 6B:
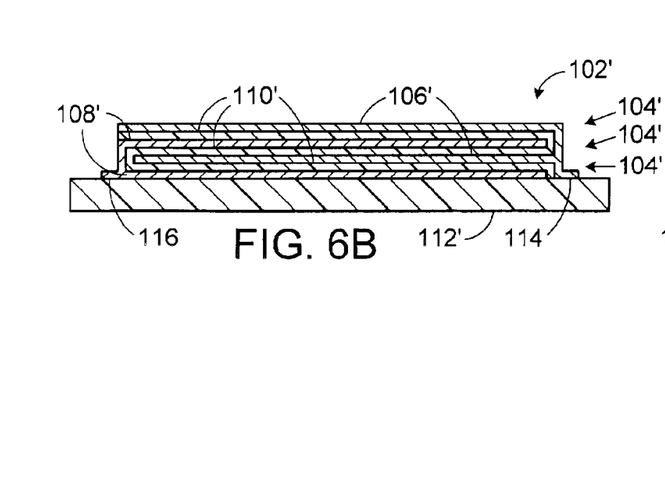
FIG. 6B is a section view taken along line 6B—6B in FIG. 6A.

The reactant channels 120 may also be created after the fuel cell materials have been deposited on the substrate without the reactant apertures 122 that together define the reactant channels 120 in place. The materials for the partially completed fuel cell elements, i.e. elements without the reactant apertures 122, are identified with a "'." As illustrated for example in FIGS. 6A and 6B, the anode materials 106', cathode materials 108', and electrolyte materials 110' may be deposited without the reactant apertures 122 in place onto a substrate 112', which also lacks reactant apertures. The manufacturing process here, which also results in the formation of contact pads 114 and 116, is essentially the same as that described above with reference to FIGS. 5A–5N but for the fact that the reactant apertures 122 are not formed simultaneously with the screen printing of the materials for the anodes, cathodes and electrolytes. The result is partially completed fuel cell assembly 102' which consists of three partially formed fuel cells 104' on the substrate material 112'. Typically, there would also be a firing at a temperature sufficient to burn off the binders in the deposited materials.

Figure 6C:
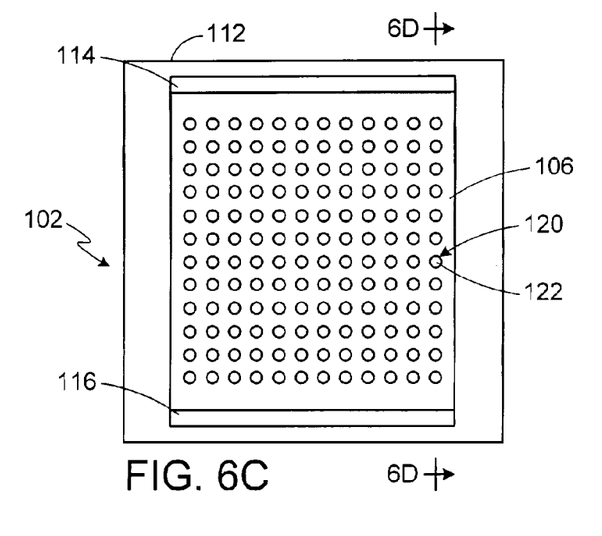
FIG. 6C is a plan view illustrating a step in a fuel cell assembly manufacturing process in accordance with a preferred embodiment of a present invention.
Figure 6D:
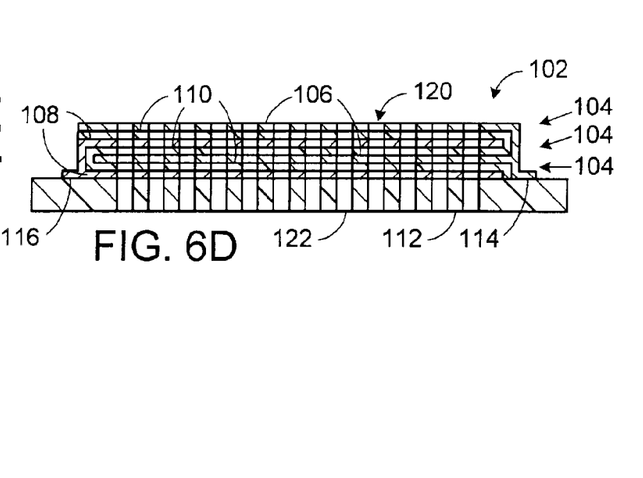
FIG. 6D is a section view taken along line 6D—6D in FIG. 6C.

Next, as illustrated for example in FIGS. 6C and 6D, the fuel cell assembly 102 (i.e. the fuel cells 104 and the substrate 112) is completed by forming the reactant channels 120 in the partially completed fuel cell assembly 102'. This is accomplished by removing the portions of the anode materials 106', cathode materials 108', electrolyte materials 110' and substrate material 112' which correspond to the reactant apertures 122. Suitable material removal techniques include chemical etching, ion milling, mechanical cutting processes such as sand blast drilling, laser ablation, liquid ablation (both with and without particles in the liquid), and punching. A final firing will typically occur after the reactant channels 120 have been formed.

It should be noted that the partially completed fuel cells 104' without the reactant apertures 122 may be formed on a substrate 112 that already includes the corresponding reactant apertures. Here, the fuel cell assembly 102 will be completed by forming reactant apertures 122 in the anode, cathode and electrolyte materials which are aligned with the corresponding reactant apertures that are already present in the substrate 112. Conversely, the completed fuel cells 104 with the reactant apertures 122 in place may be formed on a partially completed substrate 112' that does not include the corresponding reactant apertures. Here, the fuel cell assembly 102 will be completed by forming reactant apertures 122 in the substrate material 112'. Additionally, fuel cells in accordance with the present inventions which are used in combination with a system or package that does not necessitate the use of a substrate may be provided without a substrate.

Figure 7A:
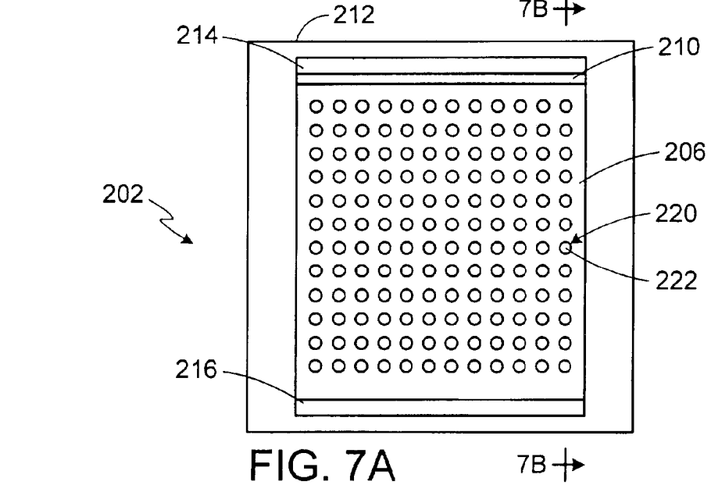
FIG. 7A is a plan view of a fuel cell assembly in accordance with a preferred embodiment of a present invention.
Figure 7B:
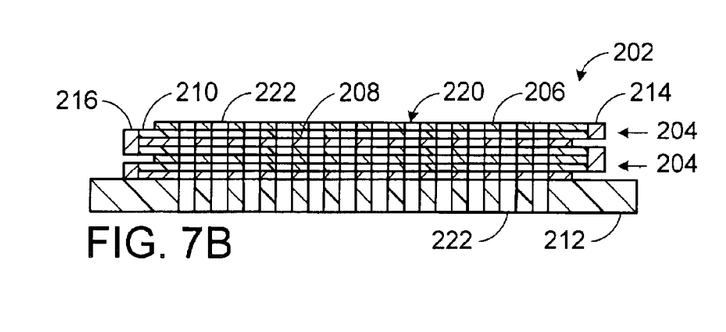
FIG. 7B is a section view taken along line 7B—7B in FIG. 7A.

Another exemplary fuel cell assembly, which also consists of three fuel cells 204 and a substrate 212, is generally represented by reference numeral 202 in FIGS. 7A and 7B. The fuel cell assembly 202 illustrated in FIGS. 7A and 7B is substantially similar to the fuel cell assembly 102 illustrated in FIGS. 2 and 3 and similar elements are represented by similar reference numerals. More specifically, the fuel cells 204 consist of anodes 206, cathodes 208 and electrolytes 210 and may be self-supporting or mounted on a substrate 212 or other suitable device after the fuel cells have been formed in the manner described below with reference to FIGS. 8A–8I. One or more reactant channels 220, which are formed by respective pluralities of reactant apertures 222 in the anodes 206, cathodes 208, electrolytes 210 and substrate 212, are also present. Detailed descriptions of many of the substantially identical aspects of the fuel cell assembly 202 have been omitted for the sake of brevity, and the prior descriptions of these aspects with respect to the fuel cell 102 are incorporated herein by reference. The fuel cell assembly 202 may also, for example, be incorporated into the fuel cell system 100 described above with reference to FIGS. 1–3. Here, however, the anode and cathode contact pads 214 and 216 are mounted on the side edges of the fuel cells 204, as opposed to being carried by the substrate. The anode contact pads 214 will typically be connected to one another, as will the cathode contact pads 216.

Figure 8A:
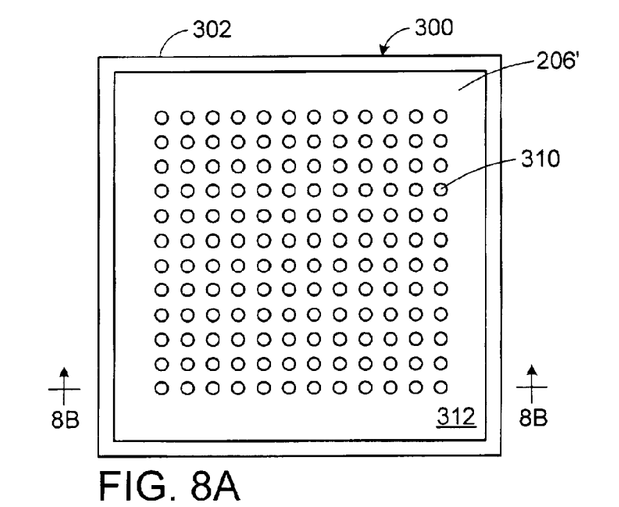
FIG. 8A is a plan view illustrating a step in a fuel cell assembly manufacturing process in accordance with a preferred embodiment of a present invention.
Figure 8B:
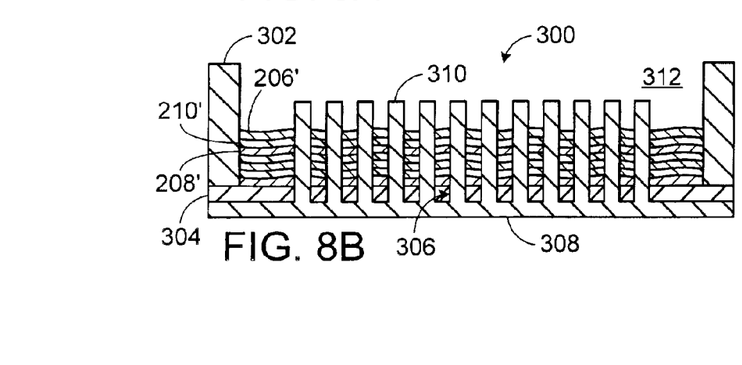
FIG. 8B is a section view taken along line 8B—8B in FIG. 8A.
Figure 8C:
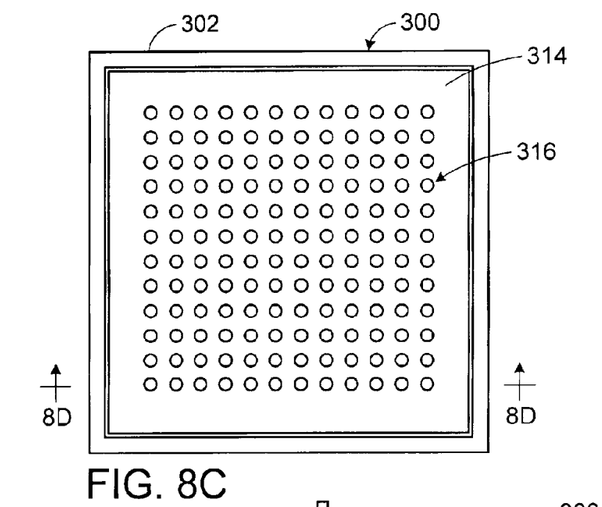
FIG. 8C is a plan view illustrating a step in a fuel cell assembly manufacturing process in accordance with a preferred embodiment of a present invention.
Figure 8D:
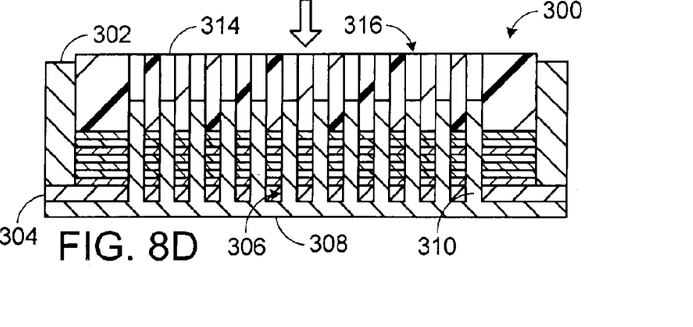
FIG. 8D is a section view taken along line 8D—8D in FIG. 8C.

With respect to manufacturing, the exemplary fuel cells 204 may be substantially formed through the use of a hot isostatic pressing process. As illustrated for example in FIGS. 8A and 8B, the hot isostatic process involves the use of a die 300 including a plurality of side walls 302, a bottom plate 304 with holes 306, and a rod plate 308 with a plurality of rods 310 that extend into the interior region 312. The bottom plate 304 is initially secured to the walls 302 and the rod plate 308 is secured to the bottom plate. The materials for each of the fuel cell elements, i.e. the anode material 206', the cathode material 208' and the electrolyte material 210', are deposited into the interior region 312, and around the rods 310, in the manner illustrated in FIG. 8B. Preferably, the materials are deposited one element at a time and are in a crystalline or nano-crystalline powdered form, or are a crystalline or nano-crystalline powder suspended in a liquid, when deposited. Turing to FIGS. 8C and 8D, heat and pressure are applied to the materials 206'-210' in the interior region 212. Pressure is applied by an insert 314 with apertures 316 that are sized, shaped, and positioned to receive the rods 310 to complete the formation of the anodes, cathodes and electrolytes. Alternatively, the heat and pressure may be applied after each layer of material is deposited into the die 300.

Figure 8E:
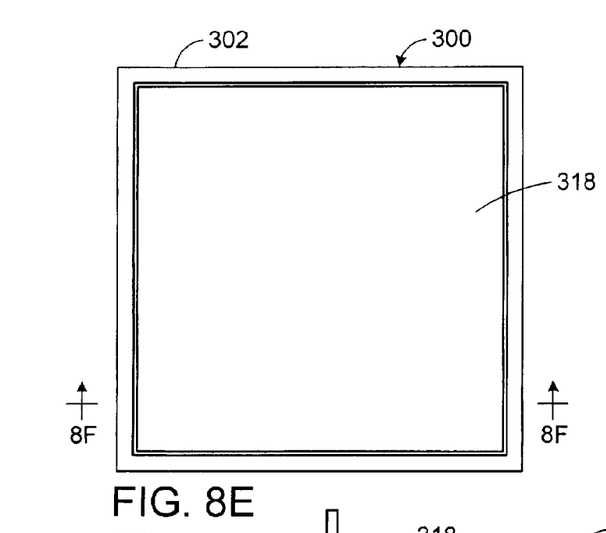
FIG. 8E is a plan view illustrating a step in a fuel cell assembly manufacturing process in accordance with a preferred embodiment of a present invention.
Figure 8F:
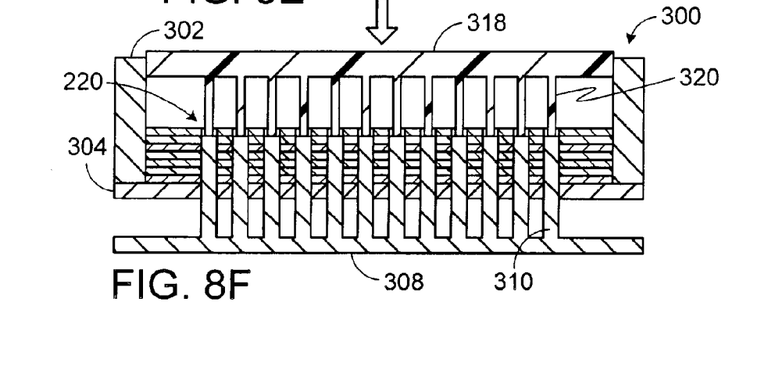
FIG. 8F is a section view taken along line 8F—8F in FIG. 8E.

Next, as illustrated for example in FIGS. 8E and 8F, the rod plate 308 is disengaged from the bottom plate 304 and an insert 318 with pins 320 is used to separate the rod plate away from the bottom plate. The pins 320 are sized, shaped, and positioned such that they will be coaxial to, but slightly smaller in diameter than, the rods 310. The rod plate 308 is then removed, thereby opening the reactant channels 220, and the bottom plate 306 is disengaged from the side walls 302 and the fuel cells 204 are removed. If necessary, an insert without pins (not shown) may be used to drive the fuel cells 204 from the die 300. In another exemplary implementation (not shown), the rods 310 are formed from a sacrificial material and are simply removed by an etching or ashing process.

Figure 8G:
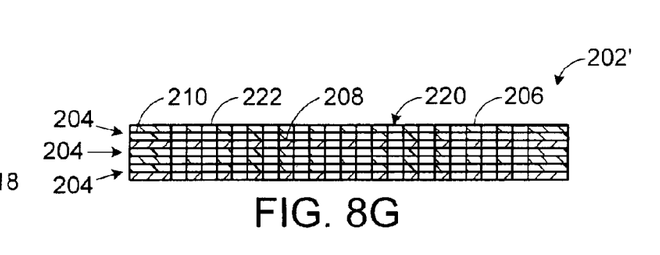
FIGS. 8G–8I are section views illustrating steps in a fuel cell assembly manufacturing process in accordance with a preferred embodiment of a present invention.
Figure 8H:
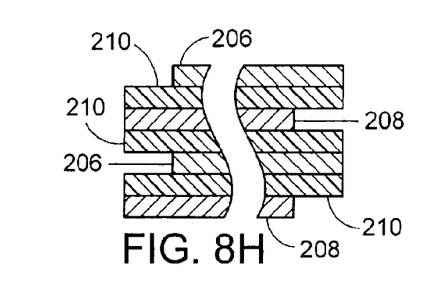
Figure 8I:
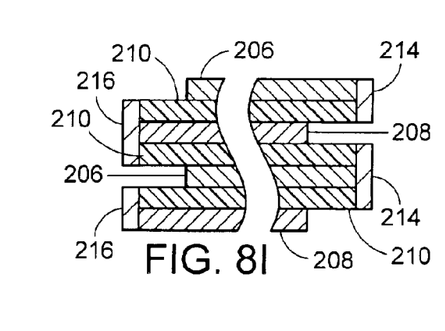

The partially completed assembly 202', which has been removed from the die 300, is shown in FIG. 8G. Turning to the contact pads, one exemplary procedure for forming the contact pads 214 and 216 is illustrated in FIGS. 8H and 8I. First as illustrated in FIG. 8H, portions of the side edges of the anodes 206 on one lateral edge of the partially completed assembly 202' are removed, while the side edges of the anodes 208 are etched on the other. Etching is a suitable removal method. Next, the anode contact pads 214 and cathode contact pads 216 are formed in the manner illustrated in FIG. 8I. Suitable materials for the contact pads include gold and platinum.

Alternatively, current collectors may be embedded in the anodes and cathodes in the manner described above. Here, in addition to removing the respective portions of the anodes and cathodes illustrated in FIG. 8G, a small portion of the anode and cathodes on the contact side would also be removed to expose the current collectors. Contact pads that are connected to the exposed portions of the current collectors may then be formed if desired.

Figure 9A:
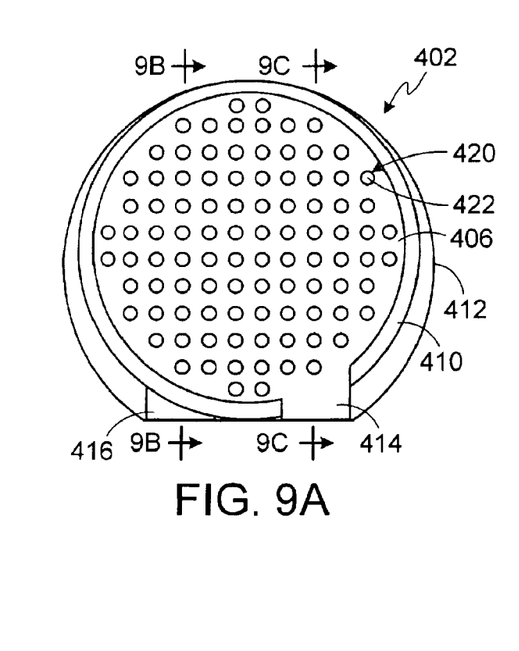
FIG. 9A is a plan view of a fuel cell assembly in accordance with a preferred embodiment of a present invention.
Figure 9B:
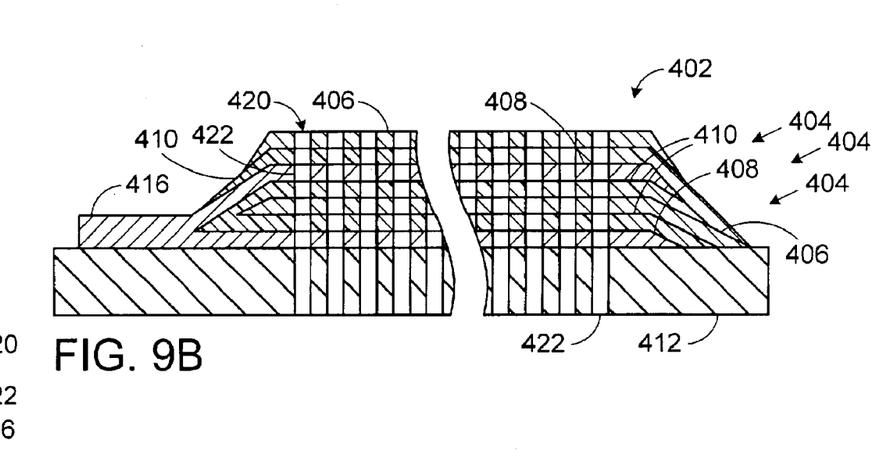
FIG. 9B is a section view taken along line 9B—9B in FIG. 9A.
Figure 9C:
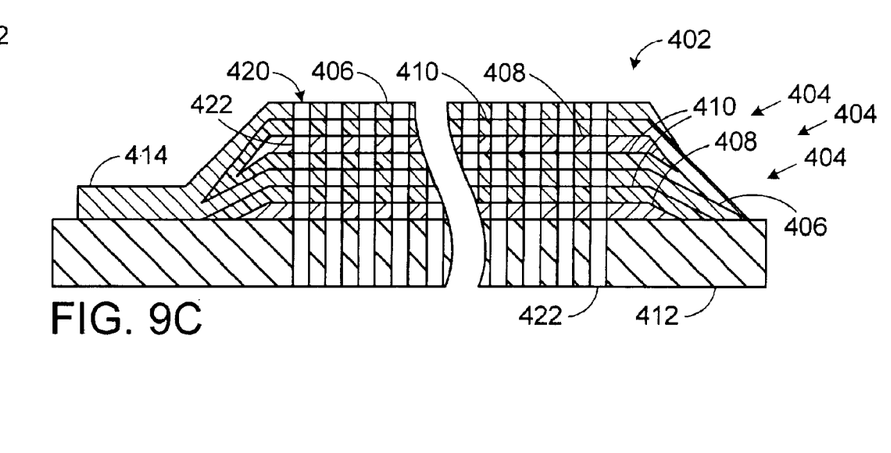
FIG. 9C is a section view taken along line 9C—9C in FIG. 9B.

Another exemplary fuel cell assembly, which consists of three fuel cells 404 and a substrate 412, is generally represented by reference numeral 402 in FIGS. 9A–9C. The fuel cell assembly 402 illustrated in FIGS. 9A–9C is substantially similar to the fuel cell assembly 102 illustrated in FIGS. 2 and 3 and similar elements are represented by similar reference numerals. More specifically, the fuel cells 404 consist of anodes 406, cathodes 408 and electrolytes 410 and may be carried on a substrate 412. One or more reactant channels 420, which are formed by respective pluralities of reactant apertures 422 in the anodes 406, cathodes 408, electrolytes 410 and substrate 412, are also present. Detailed descriptions of many of the substantially identical aspects of the fuel cell assembly 402 have been omitted for the sake of brevity, and the prior descriptions of these aspects with respect to the fuel cell 102 are incorporated herein by reference. The fuel cell assembly 402 may also, for example, be incorporated into the fuel cell system 100 described above with reference to FIGS. 1–3.

There are, however, a number of differences between the exemplary fuel cell assembly 402 illustrated in FIGS. 9A–9C and the exemplary fuel cell assembly 102 illustrated in FIGS. 2 and 3. For example, the fuel cell assembly 402 has a wafer-like design that is substantially circular (viewed in plan) with the anode and cathode contact pads 414 and 416 positioned side by side. Additionally, in those instances where the fuel cells 404 are manufactured with a deposition process, such as the sputter deposition process described below with reference to FIGS. 10A–10I, the anodes 406, cathodes 408 and electrolytes 410 will typically be thinner (e.g. about 0.5 $\mu$m to 1.0 $\mu$m).

One exemplary method of manufacturing the fuel cell assembly 402, which involves the use of sputter deposition techniques, is illustrated in FIGS. 10A-10I. The materials for each fuel cell element may be etched to the desired shape after the material for each element has been deposited. Alternatively, in the exemplary process described below, a shadow mask is employed in order to eliminate the need to etch after the material for each fuel cell element is deposited. The reactant channels are created after all of the fuel cell materials have been deposited in the exemplary method. The materials which define the partially completed fuel cell elements, i.e. elements without the reactant apertures 422 that together form the reactant channels 420, are identified with a "'."

Figure 10A:
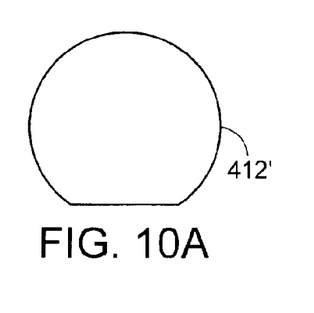
FIGS. 10A–10I are plan views illustrating steps in a fuel cell assembly manufacturing process in accordance with a preferred embodiment of a present invention.
Figure 10B:
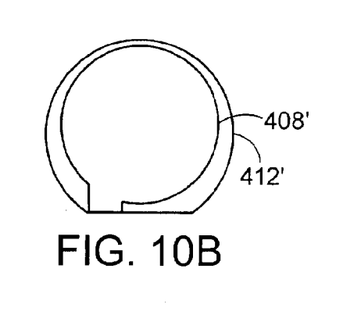
Figure 10C:
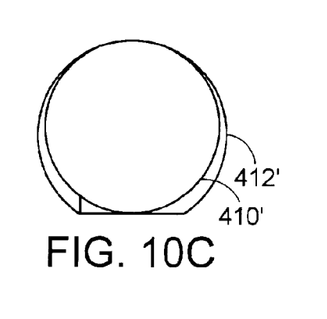
Figure 10D:
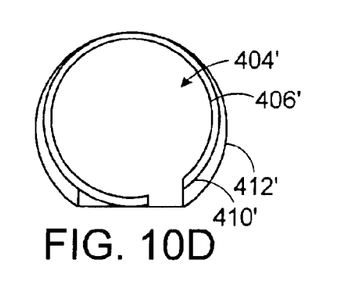
Figure 10E:
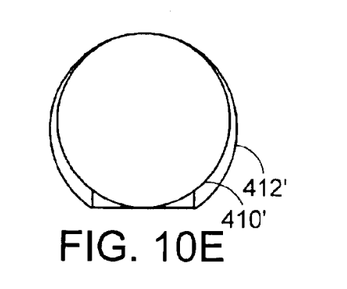
Figure 10F:
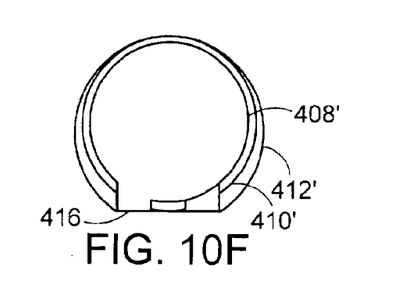
Figure 10G:
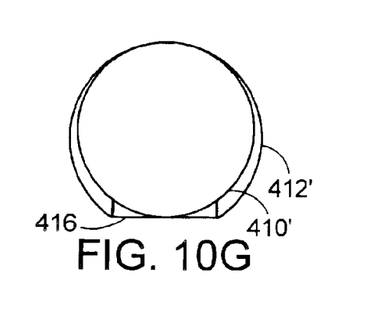
Figures 10H, 10I:
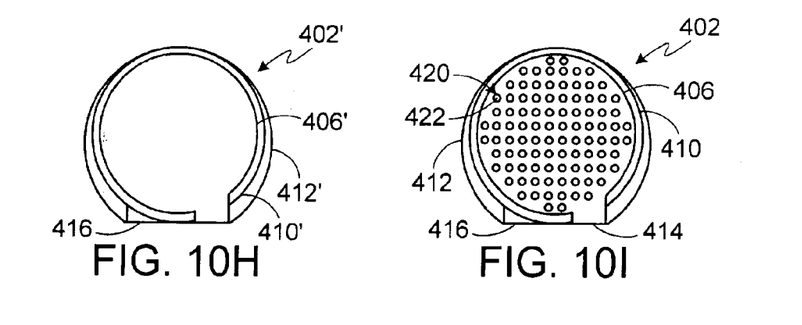

Referring first to FIG. 10A and 10I, substrate material 412' is provided without the reactant apertures 422. The material which forms the first electrode in (here, the material 408' which forms the cathode 408) the fuel cell as well as a portion of the contact pad 416 is sputter deposited onto the partially completed substrate 412', as shown in FIGS. 10B and 10I. Next, as illustrated in FIG. 10C, the material 410' which will form the electrolyte 410 is deposited onto the cathode material 408'. The portion of the cathode material 408' which will ultimately form the contact pad 416 (FIG. 10I) is left exposed. Turning to FIG. 10D, the material which forms the second electrode (here, the material 406' which forms the anode 406) is deposited onto the electrolyte material 110' and a portion of the substrate material 412'. The portion of the anode material 406' on the substrate material 412' will ultimately form the contact pad 414 (FIG. 10I). The result is the first partial completed fuel cell 404', which will be completed when the reactant channels 420 are formed.

Next, another layer of electrolyte material 410' is deposited over the anode material 406', as shown in FIG. 10E, with the portions of the anode and cathode material 406' and 408' which will ultimately form the contacts 414 and 416 left exposed. Cathode material 408', electrolyte material 410' and anode material 406' are then deposited (FIGS. 10F–10H) in the manner described above with respect to FIGS. 10B–10D, thereby forming a partially completed fuel cell assembly 402'.

As illustrated for example in FIG. 10I, the fuel cell assembly 402 is completed by forming the reactant apertures 422 which together define the reactant channels 420. This is accomplished by removing the portions of the anode materials 406', cathode materials 408', electrolyte materials 410' and substrate material 412' which correspond to the reactant apertures 422. Suitable material removal techniques include chemical etching, mechanical cutting processes such as sand blast drilling, laser ablation, liquid ablation (both with and without particles in the liquid), and punching.

With respect to sintering, the partially completed structure may be heated to a temperature of about 200° C. to about 1000° C. each time the material for an anode 406, cathode 408 or electrolyte 410 has been deposited. The exact temperature would depend on the type of materials involved. Alternatively, a single sintering may be performed after all of the materials for the anodes 406, cathodes 408 and electrolytes 410 have been deposited onto the substrate 412. In either case, it is preferable that the sintering temperature be kept below about 1000° C. until after the reactant channels 420 have been formed.

It should be noted that the partially completed fuel cells 404' without the reactant apertures 422 may be formed on a substrate 412 that already includes the corresponding reactant apertures. Here, the fuel cell assembly 402 will be completed by forming reactant apertures 422 in the anode materials 406', cathode materials 408' and electrolyte materials 410' which are aligned with the corresponding reactant apertures that are already present in the substrate 412. Conversely, the completed fuel cells 404 with the reactant apertures 422 may be formed on a partially completed substrate 412' that does not include the corresponding reactant apertures. Here, the fuel cell assembly 402 will be completed by forming reactant apertures 422 in the substrate material 412'.

Although the present inventions have been described in terms of the preferred embodiments above, numerous modifications and/or additions to the above-described preferred embodiments would be readily apparent to one skilled in the art. By way of example, but not limitation, fuel cells in accordance with the present inventions may by manufactured by a tape casting process in which the materials for the fuel cells are deposited onto a green ceramic tape. Such fuel cells will initially lack the reactant channels, which may be formed after the tape casting process is complete by, for example, a punching process. It is intended that the scope of the present inventions extend to all such modifications and/or additions.

We claim:

1. A method of making a fuel cell, comprising the steps of:
    forming a first electrode;
    forming an electrolyte substantially over the first electrode;
    forming a second electrode substantially over the electrolyte;
    at least one of the first electrode, electrolyte and second electrode being porous; and
    forming at least one reactant channel that has a perimeter surface and extends through the first electrode, the electrolyte, and the second electrode such that the first and second electrodes each define a portion of the perimeter surface of an individual reactant channel.

2. A method as claimed in claim 1, wherein
    the step of forming a first electrode comprises forming a porous first electrode;
    the step of forming an electrolyte comprises forming a porous electrolyte; and
    the step of forming a second electrode comprises forming a porous second electrode.

3. A method as claimed in claim 1, wherein the step of forming at least one reactant channel that extends through the first electrode, the electrolyte, and the second electrode comprises the steps of:
    forming the first electrode with at least one reactant aperture that extends through the first electrode in place;
    forming the electrolyte with at least one reactant aperture that extends through the electrolyte in place and substantially aligned with the at least one reactant aperture in the first electrode; and
    forming the second electrode with at least one reactant aperture that extends through the second electrode in place and substantially aligned with the at least one reactant aperture in the electrolyte.

4. A method as claimed in claim 1, wherein the step of forming at least one reactant channel that extends through the first electrode, the electrolyte, and the second electrode comprises removing at least one respective portion of the first electrode, the electrolyte, and the second electrode after materials for the first electrode, the electrolyte, and the second electrode have been deposited.

5. A method as claimed in claim 1, further comprising the step of:
    providing a substrate having at least one substrate aperture;
    wherein the step of forming at least one reactant channel comprises forming at least one reactant aperture through each of the first electrode, the electrolyte, and the second electrode that is substantially aligned with the at least one substrate aperture.

6. A method of making a fuel cell, comprising the steps of:
    providing a substrate;
    forming a first electrode on the substrate;
    forming an electrolyte substantially over the first electrode;
    forming a second electrode substantially over the electrolyte; and
    forming at least one reactant channel that has a perimeter surface and extends through the substrate, the first electrode, the electrolyte, and the second electrode such that the first and second electrodes each define a portion of the perimeter surface of an individual reactant channel.

7. A method as claimed in claim 6, wherein at least one aperture which defines a portion of the at least one reactant channel is formed in the substrate prior to the step of forming a first electrode on the substrate.

8. A method as claimed in claim 6, wherein the step of forming at least one reactant channel that extends through the first electrode, the electrolyte, and the second electrode comprises the steps of:
    forming the first electrode with at least one reactant aperture that extends through the first electrode in place;
    forming the electrolyte with at least one reactant aperture that extends through the electrolyte in place and substantially aligned with the at least one reactant aperture in the first electrode; and
    forming the second electrode with at least one reactant aperture that extends through the second electrode in place and substantially aligned with the at least one reactant aperture in the electrolyte.

9. A method as claimed in claim 6, wherein the step of forming at least one reactant channel that extends through the substrate, the first electrode, the electrolyte, and the second electrode comprises removing at least one respective portion of the first electrode, the electrolyte, and the second electrode after materials for the first electrode, the electrolyte, and the second electrode have been deposited.

10. A method of operating a fuel cell, the fuel cell including a first electrode, a second electrode, an electrolyte between the first and second electrodes, and at least one reactant channel that extends through the first electrode, second electrode and electrolyte, the portion of the at least one reactant channel associated with the first electrode defining an inlet and the portion of the at least one reactant channel associated with the second electrode defining an outlet, the method comprising the steps of:
    directing a fuel/oxidant mixture into the inlet such that at least a portion of the fuel/oxidant mixture reacts within the reactant channel and forms a byproduct; and
    directing the byproduct and any unused fuel/oxidant mixture through the outlet.

11. A fuel cell, comprising:
    an anode;
    a cathode:
    an electrolyte between the anode and the cathode;
    at least one of the anode, cathode and electrolyte being porous; and
    at least one reactant channel that has a perimeter surface and extends through the anode, cathode and electrolyte such that the anode and cathode each define a portion of the perimeter surface of an individual reactant channel.

12. A fuel cell as claimed in claim 11, wherein the anode, cathode and electrolyte are each porous.

13. A fuel cell as claimed in claim 11, further comprising:
    a substrate on which one of the anode and the cathode is positioned, the at least one reactant channel extending through the substrate.

14. A fuel cell as claimed in claim 11, wherein the at least one reactant channel defines a widest point and is at least 0.1 mm at the widest point.

15. A fuel cell as claimed in claim 14, wherein at least one of the anode, cathode and electrolyte is between about 1 µm and about 500 µm thick.

16. A fuel cell as claimed in claim 11, wherein the at least one reactant channel comprises a plurality of reactant channels arranged in a two-dimensional pattern.

17. A fuel cell assembly, comprising:
- a substrate;
- a fuel cell, including an anode, a cathode and an electrolyte between the anode and cathode, carried by the substrate;
- at least one reactant channel that has a perimeter surface and extends completely though the fuel cell and the substrate such that the anode and cathode each define a portion of the perimeter surface of an individual reactant channel.

18. A fuel cell assembly as claimed in claim 17, wherein at least one of the anode, cathode and electrolyte is porous.

19. A fuel cell assembly as claimed in claim 17, wherein the at least one reactant channel defines a widest point and is at least 0.1 mm at the widest point.

20. A fuel cell assembly as claimed in claim 19, wherein at least one of the anode, cathode and electrolyte is between about 1 µm and about 500 µm thick.

21. A fuel cell assembly as claimed in claim 17, wherein the at least one reactant channel comprises a plurality of reactant channels arranged in a two-dimensional pattern.

22. A fuel cell, comprising:
- an anode;
- a cathode;
- an electrolyte between the anode and the cathode; and
- a plurality of reactant channels that have respective perimeter surfaces, extend through the anode, cathode and electrolyte such that the anode and cathode each define a portion of the perimeter surface of each of the plurality of reactant channels, and are arranged in a two-dimensional pattern.

23. A fuel cell as claimed in claim 22, wherein at least one of the anode, cathode and electrolyte is porous.

24. A fuel cell as claimed in claim 22, further comprising:
- a substrate on which one of the anode and the cathode is positioned, the plurality of reactant channels extending through the substrate.

25. A fuel cell as claimed in claim 22, wherein the plurality of reactant channels each define a widest point and are at least 0.1 mm at the widest point.

26. A fuel cell as claimed in claim 25, wherein at least one of the anode, cathode and electrolyte is between about 1 µm and about 500 µm thick.

27. A fuel cell system, comprising:
- at least one fuel cell including an anode, a cathode and an electrolyte between the anode and the cathode, and at least one reactant channel extending through the anode, cathode and electrolyte, the portion of the reactant channel associated with one of the anode and the cathode defining an inlet and the portion of the reactant channel associated with the other of the anode and the cathode defining an outlet; and
- a reactant supply that directs a fuel/oxidant mixture into the reactant channel inlet such that at least a portion of the fuel/oxidant mixture reacts within the reactant channel and forms a byproduct and the byproduct and any unused fuel/oxidant mixture exits the fuel cell through the reactant channel outlet.

28. A fuel cell system as claimed in claim 27, wherein at least one of the anode, cathode and electrolyte is porous.

29. A fuel cell system as claimed in claim 28, wherein the anode, cathode and electrolyte are each porous.

30. A fuel cell system as claimed in claim 27, wherein the reactant supply comprises separate fuel and oxidant supplies.

31. A fuel cell system as claimed in claim 27, wherein the at least one fuel cell comprises a plurality of fuel cells.

32. A fuel cell system as claimed in claim 27, wherein the at least one reactant channel comprises a plurality of reactant channels arranged in a two-dimensional pattern.

33. A fuel cell system as claimed in claim 27, wherein the at least one reactant channel defines a widest point and is at least 0.1 mm at the widest point.

34. A fuel cell system as claimed in claim 33, wherein at least one of the anode, cathode and electrolyte is between about 1 µm and about 500 µm thick.

35. A fuel cell system as claimed in claim 27, further comprising:
- a substrate on which one of the anode and the cathode is positioned, the at least one reactant channel extending through the substrate.

36. A method as claimed in claim 1, wherein the first electrode comprises one of an anode and a cathode and the second electrode comprises the other of an anode and a cathode.

37. A method as claimed in claim 6, wherein the first electrode comprises one of an anode and a cathode and the second electrode comprises the other of an anode and a cathode.

* * * * *